United States Patent
Oztaskent

(10) Patent No.: US 10,277,956 B2
(45) Date of Patent: Apr. 30, 2019

(54) METHOD AND APPARATUS FOR STREAMING DIGITAL MEDIA CONTENT AND A COMMUNICATION SYSTEM

(75) Inventor: Ant Oztaskent, Bristol (GB)

(73) Assignee: CABOT COMMUNICATIONS, Bristol (GB)

( * ) Notice: Subject to any disclaimer, the term of this patent is extended or adjusted under 35 U.S.C. 154(b) by 918 days.

(21) Appl. No.: 12/242,993

(22) Filed: Oct. 1, 2008

(65) Prior Publication Data

US 2009/0178090 A1 Jul. 9, 2009

Related U.S. Application Data

(60) Provisional application No. 60/976,698, filed on Oct. 1, 2007.

(51) Int. Cl.

| | |
|---|---|
| *H04N 7/18* | (2006.01) |
| *H04N 21/6377* | (2011.01) |
| *H04N 7/173* | (2011.01) |
| *H04N 21/2387* | (2011.01) |
| *H04N 21/24* | (2011.01) |
| *H04N 21/658* | (2011.01) |
| *H04N 21/845* | (2011.01) |

(52) U.S. Cl.
CPC ..... *H04N 21/6377* (2013.01); *H04N 7/17336* (2013.01); *H04N 21/2387* (2013.01); *H04N 21/2407* (2013.01); *H04N 21/658* (2013.01); *H04N 21/8455* (2013.01)

(58) Field of Classification Search
CPC ............ H04N 21/2387; H04N 21/262; H04N 21/26208; H04N 21/26216; H04N 21/2407; H04N 21/6377; H04N 21/658; H04N 21/8455; H04N 21/17336

USPC .......................................................... 725/90
See application file for complete search history.

(56) References Cited

U.S. PATENT DOCUMENTS

| | | | | |
|---|---|---|---|---|
| 6,848,117 | B1 * | 1/2005 | Emura ........................... | 725/87 |
| 6,871,006 | B1 | 3/2005 | Oguz | |
| 7,627,886 | B2 * | 12/2009 | Barbanson et al. ............ | 725/90 |
| 2002/0147979 | A1 * | 10/2002 | Corson ........................... | 725/90 |
| 2003/0149988 | A1 * | 8/2003 | Ellis et al. ...................... | 725/87 |
| 2006/0093318 | A1 | 5/2006 | Cohen | |
| 2006/0117357 | A1 * | 6/2006 | Surline .......................... | 725/90 |
| 2007/0058926 | A1 | 3/2007 | Virdi | |
| 2008/0263608 | A1 * | 10/2008 | White .......................... | 725/100 |

(Continued)

FOREIGN PATENT DOCUMENTS

| | | |
|---|---|---|
| EP | 0689355 | 12/1995 |
| WO | WO2006/114759 | * 11/2006 |
| WO | 2007/083279 | 7/2007 |

OTHER PUBLICATIONS

European Search Report for EP 07 11 7682 dated Apr. 4, 2008 (2 pages).

*Primary Examiner* — Farzana Hossain
(74) *Attorney, Agent, or Firm* — Conley Rose, P.C.

(57) ABSTRACT

The invention provides a method of streaming of digital media content made up of a stream of data frames, the method comprising: during playback in one mode of the digital media content, determining parameters associated with a defined type of frame within the digital media stream; and, based upon the determined parameters, estimating the position within the digital media stream of other of the defined type of frame within the digital media stream.

30 Claims, 10 Drawing Sheets

(56) References Cited

U.S. PATENT DOCUMENTS

2008/0273698 A1\* 11/2008 Manders ................ H04N 5/783
                                                                                     380/200

\* cited by examiner

METHOD AND APPARATUS FOR STREAMING DIGITAL MEDIA CONTENT AND A COMMUNICATION SYSTEM

CROSS-REFERENCE TO RELATED APPLICATIONS

This application claims the benefit of priority to U.S. application Ser. No. 60/976,698, filed Oct. 1, 2007, the content of which is hereby incorporated by reference in its entirety for all purposes.

FIELD OF INVENTION

The invention relates to a method and apparatus for the streaming of digital media content and to a communication system. In embodiments the invention is particularly applicable to the streaming of digital video content compressed, for example, using an MPEG compression algorithm.

BACKGROUND OF THE INVENTION

Fast forwarding and rewinding digital media content requires data to be processed at a rate significantly higher than normal playback. For example, when fast-forwarding digital video content at eight times the normal speed, bandwidth requirements are also increased by a factor of eight.

It is not usually an issue when the source of the content is local, i.e. on a DVD or hard drive of the playback apparatus, but it becomes a significant problem when the content is streamed from an external source such as a source on a network because the available bandwidth is usually limited. Even when the source of content is local the load on the communications bus to the hard disk or DVD drive can become very high and so it can be desirable to reduce this load.

The problem is encountered with streaming of all types of digital media content but in particular is applicable to the streaming of video content. The problem is encountered in the field of video streaming in general, examples of which include streamed video over the public internet, inside a closed video-on-demand network, or in a home networking environment.

A number of systems have been proposed for enabling the control of fast-forwarding and rewinding, so called "trick modes", of media content over a network. U.S. Pat. No. 5,771,335 discloses such a system and FIG. 1 shows a schematic representation of the system disclosed therein. A server 100 and set-top box 200 are both connected to a network 300. The MPEG video/audio stream data is transmitted from a T1 driver 40 on the server 100 to the T1 driver 60 on the set-top box 200. To control the playback speed of this stream, a serial driver 90 on the STB communicates with a serial driver 50 of the server 100.

In standard speed playback mode, a controller 70 on the set-top box 200 instructs the server 100 to provide an MPEG stream at standard speed via the serial drivers 50 and 90. The server 100 then transmits the full stream to the set-top box 200 via the T1 drivers 40 and 60. The stream is then passed to an MPEG decoder 80 on the set-top box 200 and the decoded video is output to an external display device.

At the same time, whilst the file is being played back at normal speed, the server 100 constructs a table 11 consisting of the offsets (locations) of the I-frames at the beginning of each group-of-pictures (GOP) in the MPEG file 12 and stores it. In normal playback mode, all video packets, consisting of all GOPs, and all audio packets are transmitted to the set-top box 200.

In fast-forward mode, the set-top box 200 instructs the server 100 to provide an MPEG stream at a fast speed. The server 100 uses the table 11 to determine the position of the next video packet in the MPEG file 12 to be transmitted to the set-top box by stepping forwards in the table 12 and sends the appropriate frame. To make the playback speed faster than normal speed, the server skips over some GOPs and transmits only some of the I-frames in a GOP to the set-top box.

Rewind mode is similar to fast-forward mode in that the server 100 uses the table 11 to determine the position of the next video packet in the MPEG file 12 to be transmitted to the set-top box by stepping backwards in the table 12.

A significant disadvantage of this system is that a special proprietary server is required consisting of the table generator, the controller, the T1 driver and serial driver. A standard HTTP server cannot provide this functionality. Thus, significant additional expense and complexity is added as compared to a conventional HTTP server.

FIGS. 2A and 2B are two figures from U.S. Pat. No. 6,608,966 relating to VCR-type controls for a video server system. In this system, fast forward or rewind functionality is achieved by alternatively playing back a segment of content and skipping over a segment of content.

For example, a specific embodiment is described in which a segment of content is two seconds long. To fast forward the content, the set-top box 16 sends an instruction to a controller 12 on the server through the network 14. The controller 12 will then selectively transmit segments of content to the set-top box 16 to emulate a fast forward action. That is, two seconds of content will be played back at normal speed, then two seconds of data will be skipped, then two more seconds of content will be played and so on. This has the benefit of keeping the bandwidth required to transmit the data in "fast forward mode" exactly the same as the bandwidth required for normal speed playback.

Referring to FIG. 1 of U.S. Pat. No. 6,608,966, during normal speed playback, "(a)", all the frames in the range eleven to thirty one are played. In fast forward mode, "b", frames eleven to fourteen are played, frames fifteen to eighteen are omitted, frames nineteen to twenty two are played and so on.

There are some significant disadvantages of this system. First, a special proprietary video server having a controller component 12 for handling a request to fast forward or rewind is required. Furthermore, the patent describes a fast forward method whereby two seconds of content is played at normal speed, then two seconds of content is skipped without being played and then two more seconds of the content is played at normal speed, etc.

This is significantly different from the generally preferred trick-mode implementations used in VCR or DVD players which in the fast forward state, simply play the content at a faster-then-normal speed. Therefore, the user experience is adversely affected.

A further example of a system is disclosed in U.S. Pat. No. 6,097,422 directed to an algorithm for fast forward and fast rewind of MPEG streams. FIG. 3 is a reproduction of a Figure from this patent. In this system, a server contains multiple files for the same content. In other words a normal-speed file is stored (1×), a fast-forward file (FX) and a reverse file (RX) are all stored. It is suggested that the FX and RX files may contain I frames only.

During normal-speed playback, the 1× file is transmitted 80 by a transport controller 20 to a client 60. At the same time, a counter 40 keeps track of the index of the last I frame sent to the client 60. Then, when a user presses the fast-forward button, this causes the client 60 to send a new media request 61 to a server 50 indicating the new playback speed requested. The system 20 will then switch from the 1× file to the FX file and start transmitting the FX file to the client 60.

The position kept by the counter 40 is used to go to the correct location in the FX file corresponding to the previous location in the 1× file. When the client starts to decode and display the FX stream, the user will see faster playback. Similarly, switching to rewind mode requires the server's transport controller 20 to switch to the RX file.

This system has some significant disadvantages. First, like the two previously described systems, this solution requires a special server for its operation. A further disadvantage is that it requires multiple files for the same media content to be stored to enable different playback speeds to be achieved. This increases the storage requirements and makes it more difficult to prepare the media content before it can be made available on the server.

FIG. 3A shows a schematic representation of a known system for streaming digital media content over a network. On a client 2, data received from a source such as an external HTTP server via a network 4 is put into a data buffer 6, and when the associated MPEG decoder 8 is free, the data is pushed to the MPEG decoder 8. The MPEG decoder 8 turns the MPEG data into user-viewable form, and after this, the client 2 will usually display this data on a screen. The system includes an MPEG file library 14 with MPEG files 16 and 18.

As explained above, it is possible to fast-forward content on such a system by making the HTTP client 10 read the data from the HTTP server 20 at a higher rate, but as will be clear to those experienced in the art, this requires more bandwidth to be available on the network 4. In today's systems, higher bandwidth either costs more, or it is simply not available because of infrastructure limitations. Therefore this method is impractical. Moreover, rewinding content imposes further requirements on such a system because HTTP file transfers are one-directional, i.e. it is not possible to request data to be read from the file backwards.

In conclusion with reference to the prior art, if reliable trick mode playback is to be achieved each of the systems disclosed requires a special, customised proprietary server for operation. Furthermore, in most cases, special pre-processing of the media content is necessary. These requirements complicate the implementation and add to the cost.

According to a first aspect of the invention, there is provided a method of streaming of digital media content made up of a stream of data frames, the method comprising: during playback in one mode of the digital media content, determining parameters associated with a defined type of frame within the digital media stream; and, based upon the determined parameters, estimating the position within the digital media stream of other of the defined type of frame within the digital media stream.

Thus, it can be seen that by determining parameters about a received data stream in a first playback mode, e.g. normal playback mode, it is then possible to achieve trick-mode playback by streaming data from a conventional HTTP server over a network whilst staying within available bandwidth limits. By requesting, in trick mode, only certain parts or byte ranges of a source data stream to be transmitted over a network in dependence on determined parameters, a method and apparatus for the streaming of digital media content may be realised which is capable of use with a conventional HTTP server and of providing user friendly trick-mode playback.

Preferably, the digital media stream is an MPEG video stream and the defined type of frame is an I-frame. In this context "MPEG" means all current versions of MPEG, i.e. MPEG 1, MPEG2 and MPEG 4 part 2 or part 10, and any future version that defines the equivalent of an I-frame. Where the digital media stream is a stream other than an MPEG digital media stream the defined type of frame may be referred to generally as a "key" frame, i.e. a frame that is independently decodable by an appropriate decoder.

Preferably, the parameters are determined in dependence on a statistical analysis of the media stream during normal playback mode. Use of statistical analysis to determine the parameters enables an accurate estimate to be made of the region within a source media stream as to where a next or earlier key frame is likely to be.

Preferably, the parameters include the average length of the key frames within the digital media stream and the average separation of the key frames within the digital media stream.

Preferably, the method includes playing back in a trick mode a media stream composed only of the defined type of frame. In other words, in trick mode, once only a requested byte range has been received the key frame can be extracted therefrom and provided to a suitable decoder to display to a user. Since only certain parts of the source media stream need to be provided to the apparatus in trick mode, the bandwidth required for traffic between a source and the apparatus is correspondingly reduced.

In one aspect, the invention provides a method of enabling trick modes to be used in the playback of a digital media stream, comprising, using a method of streaming of digital media content according to the first aspect of the invention.

Preferably, during playback in a trick mode a configurable proportion of the defined type of frame, the key frames, is discarded so as to achieve a desired bandwidth for the media stream. In other words so as to ensure that the bandwidth limitations between the source and the apparatus are satisfied, a selectively configurable proportion of the key frames can be discarded and the stream then presented to a user modified accordingly.

In a preferred example, the configurable proportion is selected such as to ensure that the required bandwidth for playback of the stream in trick mode is substantially the same as that required for playback of the stream in normal playback mode.

According to a second aspect of the invention, there is provided apparatus for the streaming of digital media content, the apparatus being for connection to a source of a digital media stream, the apparatus comprising: a frequency meter for determining the frequency and average length of a defined type of frame within a received source digital media stream during a first mode of operation of the apparatus; and a playback stream controller for requesting from the source to which the apparatus is, in use, connected only parts of the source digital media stream in dependence on the determined frequency and average length of the defined type of frame.

According to a third aspect of the invention, there is provided a method of playback of a source digital media stream in trick mode, the method comprising, during playback in normal mode of a source digital media stream received from a source, determining one or more parameters about certain types of frames within the source digital media stream; on selection of a trick mode, using the parameters determined about the certain types of frames within the source digital media stream to selectively request from the source only certain parts of the source digital media stream; and from the requested parts extracting only the certain type of frame for playback in trick mode.

A method and apparatus for the playback of a digital media stream such as an MPEG video is provided by which in normal playback mode data about certain types of frames is collected. This data is then utilised to enable an estimate to be made as to the likely position within the source digital media stream of other of the certain type of frames. In the example of MPEG video this could be the location within the source stream of I frames.

Using this information it is possible to request from a conventional HTTP server only ranges of data that are expected to include I frames. Therefore since playback in a trick mode can be executed by playing only I frames it is possible in real time to obtain a data stream for displaying to a user a trick mode playback and since only certain ranges of data need to be transferred from a source such as an HTTP server to a client bandwidth requirements can be reduced as compared to if the entire digital media stream is requested for trick mode playback.

Preferably, in trick mode playback, the certain parts of the source digital media stream requested are those expected to include one or more I frames.

Typically I frames make up about 25% of an MPEG digital media stream. Therefore, since it is only data ranges expected to include at least one I frame that are requested from the source the bandwidth required to enable trick mode playback from the source to the apparatus is significantly reduced.

According to a fourth aspect of the invention, there is provided a communication system, the system comprising: a source of a digital media stream; apparatus for playback of a digital media stream connected to the source of the digital media stream, wherein the apparatus is apparatus according to the second aspect of the invention.

Preferably, the source of the digital media stream is an HTTP server, e.g. an HTTP1.1 server, including a memory for storing one or more digital media files.

According to a fifth aspect of the invention, there is provided a method of streaming of digital media content, the method comprising: at a data source configured to provide a stream of digital media content made up of a stream of data frames, receiving from a user system a request for a certain block or blocks of the stream of data frames estimated to include a defined type of frame; in response to the request providing to the said user system a stream of data frames including only the requested block or blocks.

A method is provided by which a data source, such as an HTTP server, is configured to receive a request from a user for a certain data block within a digital media stream and to provide only the block to the user. The request is for a block estimated to include a certain type of frame and therefore, in the case of an MPEG video stream, it is possible to provide blocks estimated to include the I frames from the video. Thus the I-frames from the video can be obtained by the user without requiring the entire video to be streamed to the user from the source. This is particularly advantageous where, for example, the source and the user are communicating via limited bandwidth available on a network, e.g. over the internet. The method does not put any restrictions on the data byte-range to be requested from/provided by the server: it can start at any point in any of the frames, or it can even start in non-video data inside the stream, and it can end at any arbitrary location. Thus, it is possible to use a standard HTTP server in the system.

According to a further aspect of the invention, there is provided a method of streaming of digital media content made up of a stream of data frames, the method comprising during playback in one mode of the digital media content, determining parameters associated with a defined type of frame within the digital media stream; and, based upon the determined parameters, estimating the position within the digital media stream of other of the defined type of frame within the digital media stream.

According to a further aspect of the invention, there is provided apparatus for the streaming of digital media content, the apparatus comprising a frequency meter for determining the average separation and average length of a defined type of frame within a received source digital media stream during a first mode of operation of the apparatus; and a playback stream controller for requesting only the defined type of frame from a source of the source digital media stream in dependence on the determined frequency and average length of the defined type of frame.

According to a further aspect of the invention, there is provided a method of playback of a source digital media stream in trick mode, the method comprising, during playback in normal mode determining one or more parameters about certain types of frames within the source digital media stream; on selection of a trick mode, using the parameters determined about the certain types of frames within the source digital media stream to selectively request only certain parts of the source digital media stream; and from the requested parts extracting only the certain type of frame for playback.

BRIEF DESCRIPTION OF THE DRAWINGS

Examples of embodiments of the invention will now be described with reference to the accompanying drawings, in which:

FIG. 4 is a schematic representation of a communication system including a server 22 which may be a conventional HTTP server and a client server 24 each connected to a network 26 over which information may be communicated between the HTTP server 22 and the client server 24. The network 26 may be the internet or any other public or private network.

Figure 1:
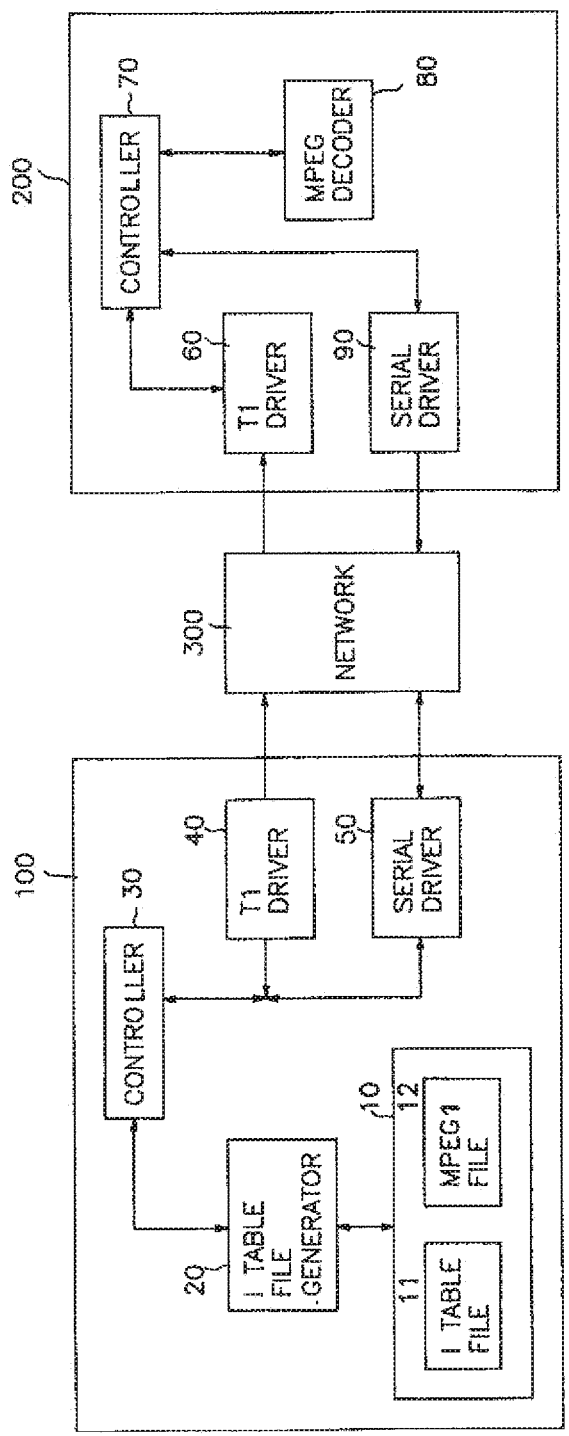
FIGS. 1, 2A, 2B, 3, and 3A show schematic representations of systems for digital media playback.

The system enables media streaming over the network 26. It is applicable to video-on-demand systems that allow content to be streamed to a client from a central server outside the local network, and to media sharing systems that allow content to be streamed to a client from a local server within the local network. Both the client 24 and the server 26 may be software applications running on a computer or they may be stand-alone devices such as set-top boxes, digital video recorders or television sets.

The HTTP server 22 needs the components associated with a conventional HTTP server only. In other words, no modification or additions are required to a conventional HTTP server 22 to enable it to function as required.

Referring to the client server 24, an HTTP client 28 is provided in two-way communication with the network 26. A data buffer 30 is arranged to receive data from the HTTP client 28 and provide this to an MPEG passer 32 and from there on to an MPEG decoder 34. A feedback loop 36 is provided via a frequency meter such as an I-frame frequency meter 38 and a playback speed controller 40.

In its simplest form, the client server 24 is arranged during a first mode, e.g. normal playback mode, to determine parameters associated with a defined type of frame within a digital media stream received from the server 22. Typically, when the digital media stream is an MPEG stream, the parameters determined with respect to the digital media content include the separation of I-frames within the digital media stream and the length of I-frames within the media stream.

This information, determined by the I-frame frequency meter 38 is used when a user requires to fast-forward or rewind the digital media content being viewed, i.e. to view or operate the system in a trick-mode. By determining the length and separation of I-frames, e.g. consecutive I frames, an estimate may be made as to the position within the source digital media stream provided by the HTTP server 42, of the next or previous I-frame.

Thus, the playback speed controller 40 is able to use this information to request only the data blocks from the digital media stream that are expected to include the next or previous I-frames. It is only these blocks which are then streamed over the network 36. The I-frames can then be extracted and played to produce a fast-forward or rewind display whilst not requiring, in trick-mode the entire source media stream to be downloaded from the server 22. In other words, trick mode playback can be achieved without requiring the additional bandwidth that would be required if the entire data stream were to be downloaded from the source at a higher than normal speed which is of course what would usually be needed to enable a fast forward playback to be achieved.

Thus, statistical data about MPEG I-frame lengths and separation may be obtained for a current file during normal-speed playback. Using this data, the locations of I-frames within the MPEG stream may be estimated and then, during trick-mode playback, only those data blocks or sections of the entire original source stream expected to include I-frames may be selectively requested from an HTTP server in order to reduce bandwidth requirements in trick-mode states.

Figure 4:
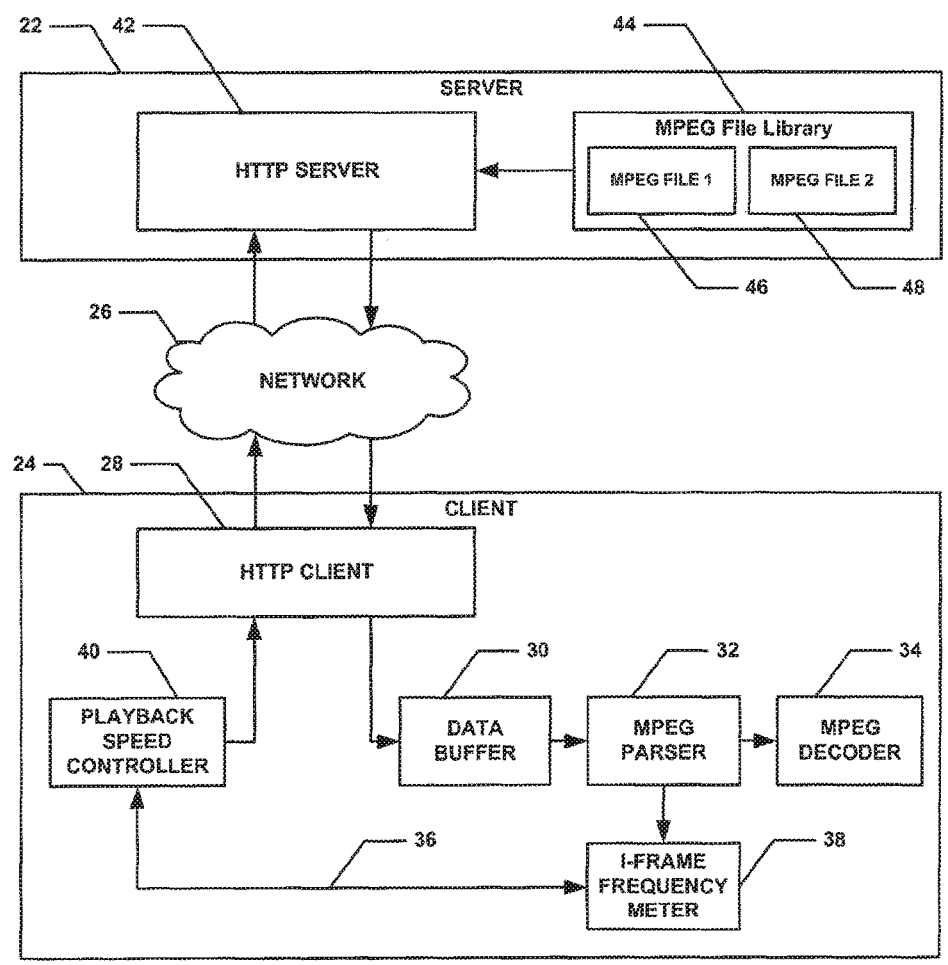
FIG. 4 shows a schematic representation of a communication system including apparatus for digital media playback.

In FIG. 4, the server 22 typically includes an HTTP server 42 which may be a conventional HTTP server. In addition, an MPEG file library 44 is typically provided which includes various MPEG files 46 and 48. The MPEG file library may be provided on a hard disk drive (not shown) or indeed any other suitable storage device. Thus, when a client requests a particular MPEG file from the server 22, the file is retrieved from the file library 44 and provided by the HTTP server 42 via the network 26 to the client server 24.

The HTTP server 42 is configured to accept partial requests of byte-ranges. The HTTP client 28 requests the HTTP header for a specific MPEG file 46 from the HTTP server 42 through the network 26 thereby establishing an HTTP connection with the HTTP server 42. In order to reduce the overhead of establishing an HTTP connection with each byte-range request, the HTTP client 28 preferably requests this HTTP connection to be persistent, therefore the HTTP server must, in this case, also support persistent connections which is of course an inherent feature of HTTP1.1 servers.

The HTTP client 28 stores in memory the file details provided by the HTTP server 42 through the HTTP header. Persistent connections are well known and understood but a detailed description of persistent HTTP connections may be found, for example, in section 4.5 ("Persistent Connections") of "HTTP: The Definitive Guide" by Gourley, et al.

Once the HTTP connection is successfully established, the playback speed controller 40 on the client 24 becomes responsible for making byte-range requests for the MPEG file 46. During normal-speed playback mode, the speed controller 40 instructs the HTTP client 28 to request continuous byte-ranges for the file 46 from the HTTP server 42. For example, first a byte-range consisting of bytes 0-32 KB may be requested from the HTTP server, then the byte-ranges 32 KB-64 KB, 64-96 KB, 96-128 KB, etc. may be requested.

A byte-range received from the HTTP server 42 is passed onto the data buffer 30 where it may be stored until the MPEG decoder 34 is ready to process any data. When the MPEG decoder 34 is ready, the data is passed through an MPEG Parser 32 to the decoder 34. The MPEG decoder 34 decodes the data and after this point, the client 24 will normally display the data on a screen. In one embodiment the client may also store data locally on a disk for later viewing. For a detailed description of HTTP requests for partial byte-ranges in a file, see section 15.9 ("Range Requests") of "HTTP: The Definitive Guide" by Gourley, et al.

During normal-speed playback, the speed controller 40 instructs the I-frame frequency meter 38 to continuously measure (i) the size of each I-frame that has been encountered in the MPEG data as well as (ii) the separation of consecutive I-frames. In this mode of operation, the MPEG parser 32 searches and identifies each PES (packetised elementary stream) packet location in the data passed through it. At the same time, the MPEG parser 32 notifies the frequency meter 38 about the size of each PES packet and about whether or not it contains the beginning of a P, B or I-frame. Using this information, the frequency meter can calculate an approximation or estimate for the position of the next n-th and previous n-th I-frames in the file, whenever requested.

A preferred embodiment uses the average I-frame size and average separation of I-frames to make predictions. For example, the location of the 3rd I-frame after the current position in the MPEG file 46 can be calculated as $$\text{end}_{prev} + (3 \times \text{dist}_{i\text{-}frame}) - \text{len}_{i\text{-}frame}$$

in which $\text{end}_{prev}$ is the location of the end of the previous I-frame, $\text{dist}_{i\text{-}frame}$ is the average distance (or separation) (in bytes) between two I-frames, and $\text{len}_{i\text{-}frame}$ is the average length of a single I-frame.

In order to reduce the computational requirements, a preferred embodiment enables the MPEG parser 32 and frequency meter 38 only for brief time intervals during operation. For example, once the frequency meter has captured the size details of, say twenty I-Frames, the MPEG parser 32 and frequency meter 38 may both be turned off for, say, ten seconds and then enabled again to capture the details of another twenty I-frames. When the MPEG parser 32 and frequency meter 38 are disabled, data will be directly passed from the data buffer 30 to the MPEG decoder 14. This way, the preferred embodiment will always have up-to-date I-frame details for the current file, but the processing overhead will be less.

Figure 3:
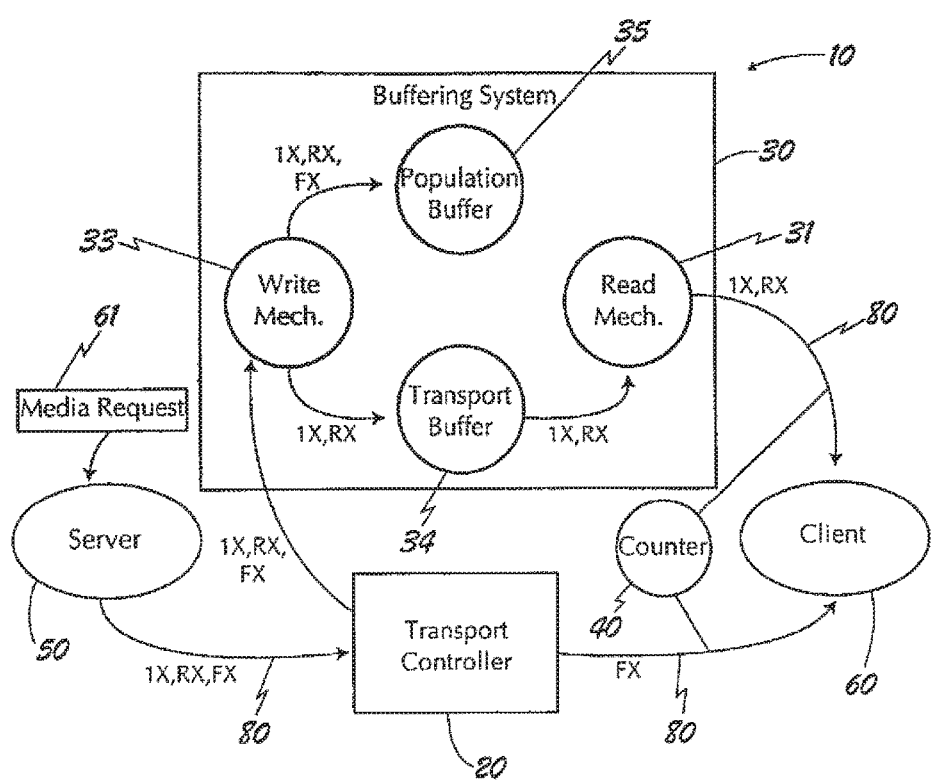
Figure 3A:
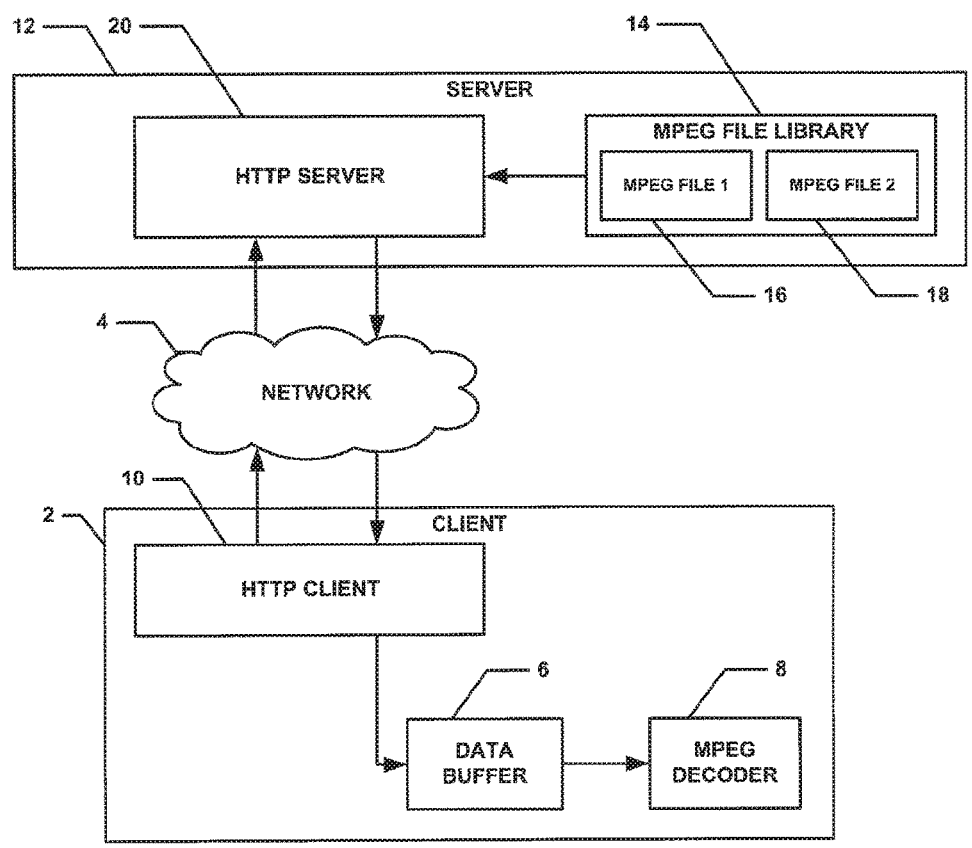

In trick modes, the system is able to reduce the bandwidth requirements for communication between the server 22 and client 24 as compared to what would be required to achieve trick-mode playback in a system such as, for example, that shown in FIG. 3A. This is achieved by skipping over parts of the file that do not contain I-frames. Due to the fact that it is impossible to know the locations and lengths of I-frames in an MPEG file in advance, the client uses statistical data gathered during normal-speed playback to estimate the locations for the required I-frames for use during trick-mode playback.

Therefore, in order to keep the bandwidth requirements independent of the playback speed, instead of playing all the I-frames in the MPEG file at a higher speed, a preferred embodiment achieves frame-rate reduction by playing all the I-frames at 2× speed, ½ of the I-frames at 4× speed, ¼ of the I-frames at 8× speed, etc. This way, the bandwidth requirements are not expected to be significantly if at all higher than 100% of the original bandwidth no matter what the playback speed is. In a more general sense, a selectively configurable proportion of the I frames may be discarded to ensure a desired bandwidth requirement as compared to the bandwidth requirement for normal speed playback mode.

Table 1 below summarizes these points. The last horizontal row shows the bandwidth requirements for a preferred embodiment.

TABLE 1

| Bandwidth requirements (as percentage of bandwidth required for normal playback) | Normal playback at 1× speed | I-frame-only playback at 1× speed | I-frame-only playback at 2× speed | I-frame-only playback at 4× speed | I-frame-only playback at 8× speed |
| --- | --- | --- | --- | --- | --- |
| Ideal values (without I-frame searching) | 100% | 100% | 200% | 400% | 800% |
| Ideal values (with I-frame searching) | 100% | 25% | 50% | 100% | 200% |
| Experimental results (with I-frame searching) | 100% | 50% | 100% | 200% | 400% |
| Experimental results (with I-frame searching and frame-rate reduction) | 100% | 50% | 100% | 100% | 100% |

Considering a typical MPEG file where about 25% of the file data consists of I-frame data, playing only the I-frames in a file should reduce the bandwidth requirements to 25% during playback at 1× speed, in the ideal case, i.e. provided that the exact location and length of each I-frame is known. In the ideal case, if all the I-frames in an MPEG file are played, the bandwidth requirements for playback should be 50% of the original at 2× speed, 100% of the original at 4× speed, 200% of the original at 8× speed, and so on. However, since it is actually impossible to know the I-frame locations and lengths accurately, one can never achieve these ideal values in practice, and therefore some tolerance is preferably added to such a predictive system.

It is understood that the prediction for the next required I-frame location cannot always be completely accurate and it may be required to continue searching for an I-frame and request more data from the server before the I-frame is actually found in the file. This will create an extra overhead on the bandwidth requirements. During experiments with typical MPEG files, it has been observed that in some cases, applying the method described above to predict the location of the next I-frame and using that data to request and play only the I-frames in a file at 2× speed requires up to 100% of the original bandwidth (as opposed to the ideal value of 50% above). Likewise, 4× speed may require up to 200% bandwidth and 8× speed may require 400% bandwidth.

A typical MPEG file contains about 2 I-frames per second and the rest are P and B frames. P and B frames only contain differential data and therefore cannot be decoded without also decoding the frames they depend on. I-frames, on the other hand, do not depend on other frames and they can be individually decoded. During trick modes, the client 24 only sends I-frames to its MPEG decoder. In order to appear responsive to the end-user, a preferred embodiment should display about 4 I-frames per second in trick-mode state.

Therefore, based on the assumption that MPEG file 26 contains 2 I-frames per seconds, a preferred embodiment should play all the I-frames ($1^{st}$, $2^{nd}$, $3^{rd}$, $4^{th}$, ... ) in MPEG file 26 at 2× speed; it should play every other I-frame ($1^{st}$, $3^{rd}$, $5^{th}$, $7^{th}$, ... ) in MPEG file 26 at 4× speed; and it should play every $4^{th}$ I-frame ($1^{st}$, $5^{th}$, $9^{th}$, $13^{th}$, ... ) at 8× speed. In such an embodiment, the next required I-frame is always (speed/2) I-frames after the current I-frame.

After determining the next required I-frame, the speed controller 40 queries the I-frame frequency meter 38 for the predicted offset of that I-frame. The speed controller 40 then instructs the HTTP client 28 to request the byte-range which starts from the predicted offset. When the requested byte-range data is received and buffered by the data buffer 30, the MPEG parser 32 searches the data to find the exact beginning of the next I-frame and discards any data preceding it. This is preferably included to provide the MPEG decoder 34 with a clean stream of I-frames only, without extraneous data in between. When the MPEG parser 32 determines that the end of an I-frame is reached, the procedure is repeated with the speed controller 40 requesting the data block expected to include next required I-frame. This continues until either the end of the MPEG file 46 is reached, or the client 24 is put into standard-speed playback mode again e.g. by a user.

Figure 5:
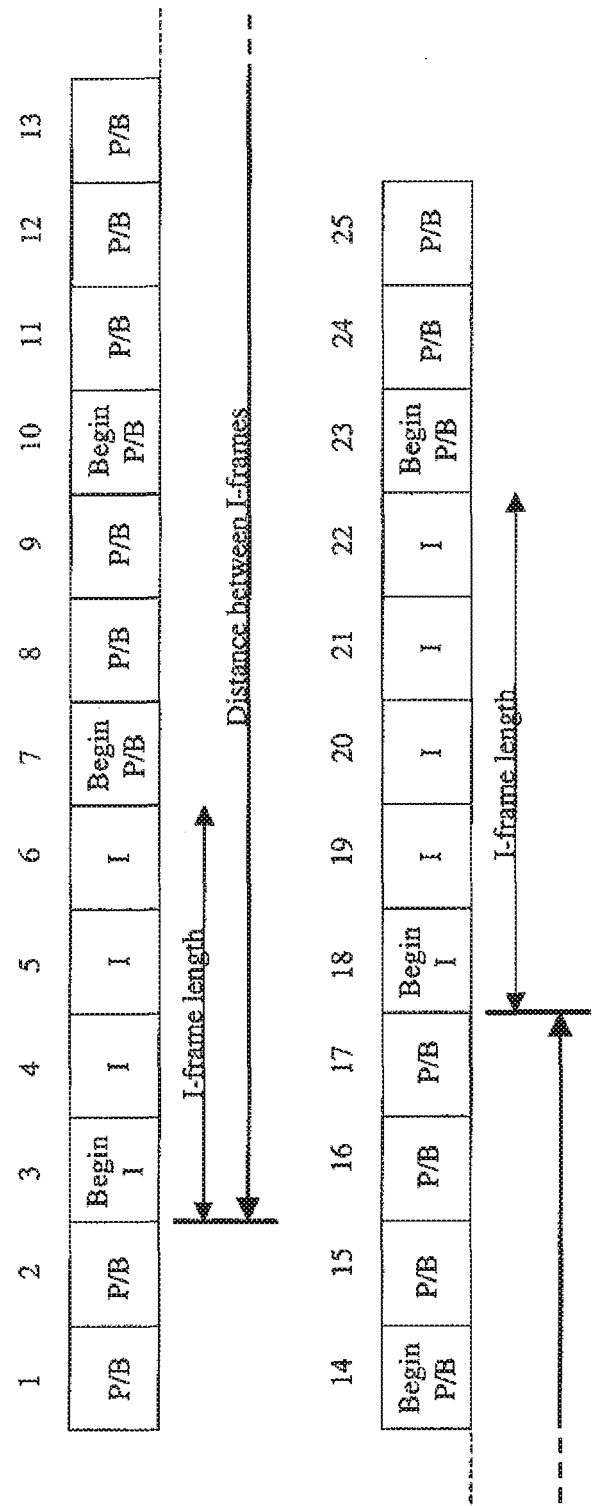
FIG. 5 shows a schematic representation of a digital media stream.

FIG. 5 shows a simplified representation of a small part of a much larger MPEG stream. Each box denotes a PES packet. Boxes entitled "Begin I" contain the beginning of an I-frame, and this is identifiable by the header of the PES packet. Boxes entitled "I" contain the rest of the I-frame. Therefore, in the figure, PES packets 3, 4, 5 and 6 together contain a single I-frame. In an MPEG stream, an I-frame is usually followed by P or B frames. The fact that P and B frames contain differential data only allows them to be more compact, but their dependency on other frames makes it impossible for P and B frames to be decoded on their own.

In FIG. 5, "Begin P/B" denotes the beginning of a P or B-frame. Boxes entitled "P/B" identify the PES packets making up the rest of the P/B frame. For example, in the figure, PES packets 7, 8 and 9 together make up a single P or B frame as do PES packets 10 to 13 and 14 to 17. The end of an I-frame is identifiable by the beginning of any other frame. The length of an I-frame in a file is the total length of all PES packets making up the I-frame. As illustrated in FIG. 5, the separation of two I-frames is the distance or separation within the MPEG stream between the beginnings of their respective "Begin I" packets. The MPEG Parser and I-Frame Frequency Meter components in the client 24 use these principles to calculate a prediction for I-frame lengths and separations.

Referring again to FIG. 4, in normal-speed playback mode, the primary aim of the system is to decode on the client 24 an MPEG file 46 that resides on the server 22. The file is received through an open HTTP connection between the HTTP client 28 and HTTP server 42. A second aim of the system in normal-speed playback mode is to accumulate enough data about the current MPEG file 46 to provide a reliable prediction or estimate for I-frame lengths and I-frame separations.

Figure 6:
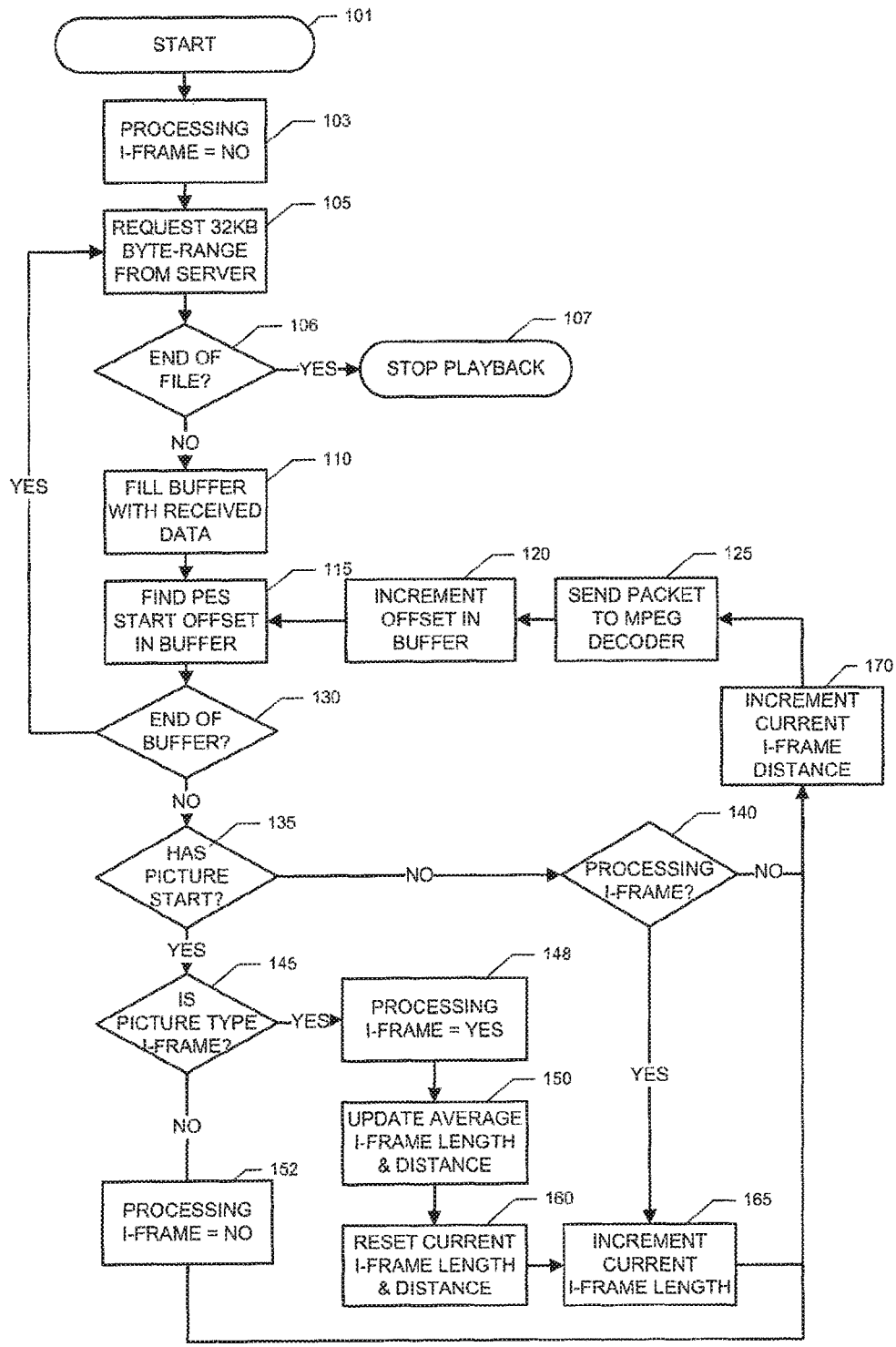
FIG. 6 is a block diagram showing the steps in a method of digital media playback.

FIG. 6 illustrates the details of a preferred embodiment to achieve this. The process begins with the client 24 clearing an indicator for whether or not the system is currently processing an I-frame (step 103). Then, in this example, 32 KB of MPEG file data is requested from the server 22 (step 105). The HTTP server 42 in this system is a standard HTTP server supporting byte-range requests and persistent connections. No other requirements are imposed on the server.

The client 24 then checks whether the end of the file is reached (step 106). The HTTP server indicates successful transmission of requested data with a response containing a status code equal to 200 or 206. If the end of the file is reached, i.e. the client has received any status code other than 200 or 206, playback is stopped (step 107). Otherwise, the received data is put into the buffer 10 (step 110). For a detailed list of HTTP status codes, see Appendix B.2 ("Status Codes") of "HTTP: The Definitive Guide" by Gourley, et al, the entire content of which is hereby incorporated by reference.

Next, the MPEG parser 32 finds the next PES packet start offset in this data (step 115). The MPEG parser 32 then determines whether the PES packet contains the start of any type of frame (step 135). If, at this point, the end of the buffer is reached (step 130), another 32 KB byte-range is requested and the process continues from step 105. Note that the 32 KB range is the range directly following the previous 32 KB range. For a detailed description of the headers identifying PES packets, see Chapter 13 pp. 653-662 of "Video Demystified" by Jack, the entire content of which is hereby incorporated by reference.

If the PES packet found in step 115 does not contain the beginning of a frame (a picture start indicator), it is interpreted to be the continuation of a previous frame (like packets 4, 5, 6 in FIG. 5). Therefore, if an I-frame is already being processed (step 140), both the I-frame length and separation is incremented (steps 165 and 170) and the packet is sent to the MPEG decoder 34 (step 125).

If any other type of frame (i.e. P-frame or B-frame) is being processed (step 140), the packet is sent to the MPEG decoder 14 after only incrementing the I-frame separation or distance (steps 170 and 125). For a detailed description of the headers identifying picture types within a PES packet, see Chapter 13 pp. 608 of "Video Demystified" by Jack, the entire content of which is hereby incorporated by reference.

If the PES packet found in step 115 does contain the beginning of a frame (step 135), then the picture type must be identified. If the picture type is I-frame (step 145), the average values for the I-frame length and separation or distance are updated (step 150) using the current I-frame length and distance. Then, since there is a new I-frame, the "processing I-frame" indicator is set to "yes" (step 148), and the current I-frame length and distance is reset to zero (step 160).

The current I-frame length and separation is then incremented and the packet is sent to the MPEG decoder 34 to be decoded (steps 165, 170 and 125). If the picture type is not an I-frame (step 145), the frame being processed is no longer an I-frame, so the "processing I-frame" indicator is set to "no" (step 152), and only the I-frame distance is incremented (step 170). The packet is sent to the MPEG decoder 34 (step 125).

In all of the above cases, after the data is decoded (step 125), the offset in the buffer is incremented (step 120) and the whole process is repeated until the end of the file is reached or the user has explicitly stopped playback.

The aim of the system in fast-forward or rewind states is to only play I-frames and to play them at a higher-than normal speed. A preferred embodiment will play 4 I-frames per second, regardless of the current speed. It will skip all the other data in between those frames in order to reduce the bandwidth requirements.

Figure 7:
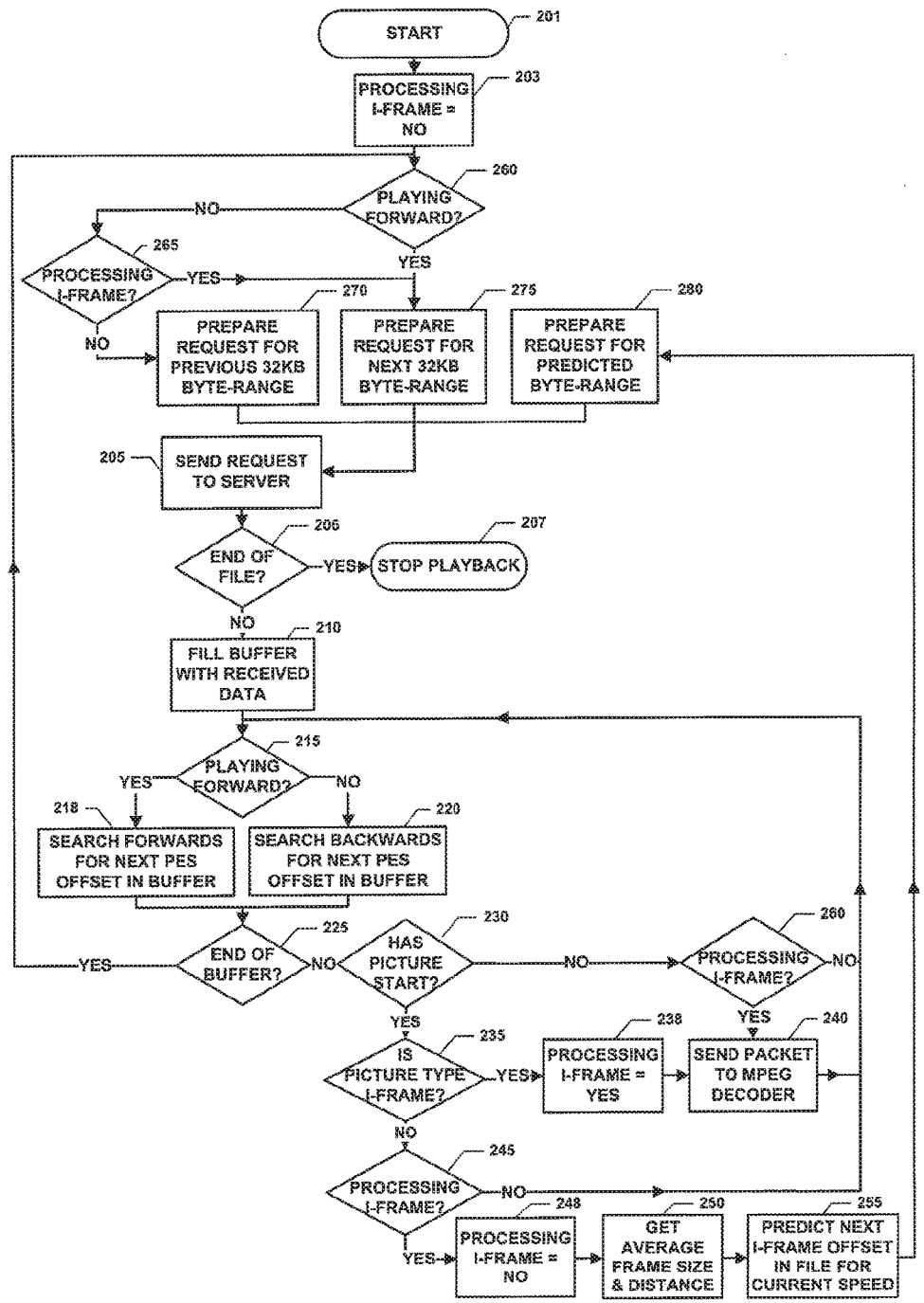
FIG. 7 is a flow diagram showing the steps in a method of digital media playback.

FIG. 7 illustrates the details of a preferred embodiment operating in a trick-mode (either fast-forward or rewind).

Referring to FIG. 7, after entering trick-mode state (step 201) in response, for example, to a user selecting "fast forward" or "rewind" on a controller such as a remote control unit, an indicator for whether or not the client is currently processing an I-frame is cleared (step 203).

In fast forward mode, the playback direction is forward, so step 275 always follows step 260, and a request for the next, in this example, 32 KB byte-range of the MPEG file 51 is prepared. This request is for the 32 KB byte-range immediately following the previously received byte-range. After this request is sent to the server 22 (step 205), the client 4 checks whether the end of the file is reached (step 206). The HTTP server will indicate successful transmission of the requested byte-range with a response containing a status code equal to 200 or 206. If the end of the file is reached, i.e. if a status code other than 200 or 206 is received, playback is stopped (step 207), otherwise the received data is put into the data buffer 30 (step 210).

Next, the playback direction is checked again (step 215). In fast-forward mode, step 215 is always followed by step 218, so the embodiment will start from the beginning of the buffer and search for a PES packet. If, at this point, the end of the buffer is reached (step 225) without finding the beginning of a PES packet, another 32 KB byte-range is requested from the server (step 205).

Figure 2A:
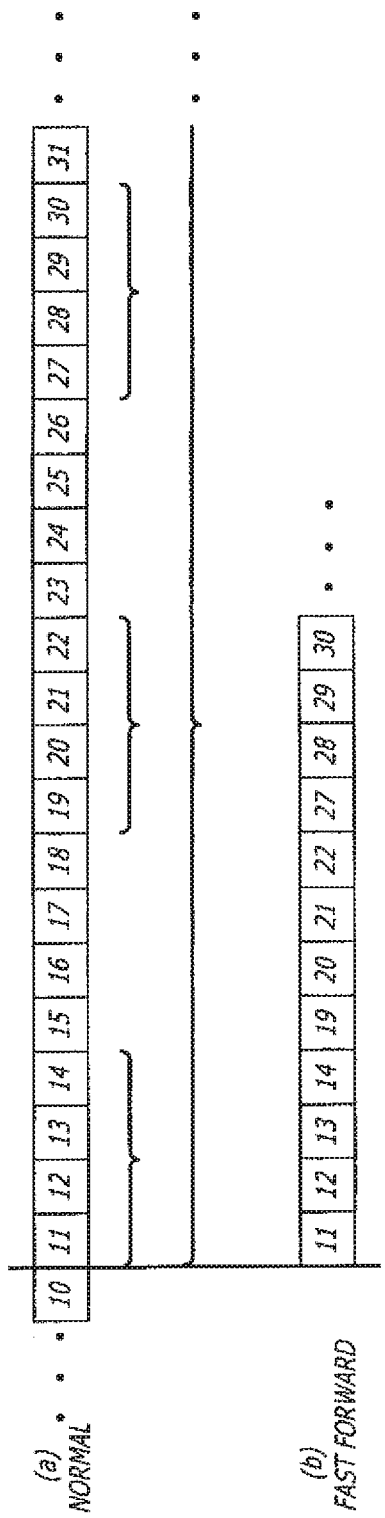
Figure 2B:
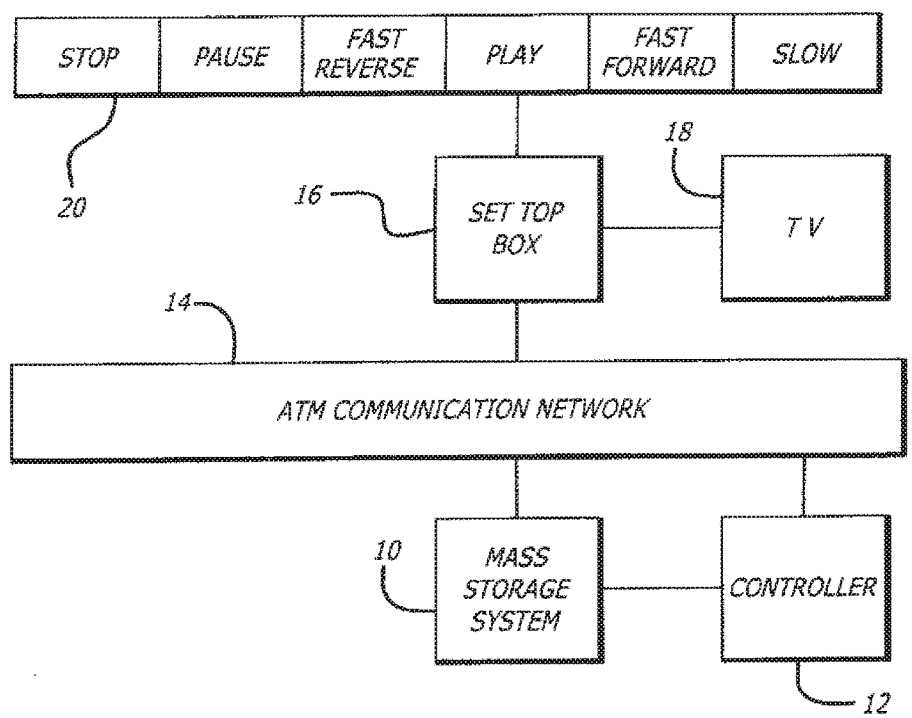

If the PES packet found in step 218 has a picture start indicator (step 230), and the picture type indicates an I-frame (step 235), this means the first PES packet belonging to an I-frame (like packet 3 in FIG. 2) is being processed, so the "processing I-frame" indicator is set to "yes" (step 238). The packet is sent to the MPEG decoder 34 (step 240) and the offset in the buffer is incremented by the PES packet size and the process is repeated from step 215. After this point, the client's aim is to decode all the packets belonging to this I-frame and when it encounters the start of another frame, it is configured to predict the starting point of the next required I-frame and jump to it. The implementation of this will be described in detail below.

If the PES packet does not have a picture start indicator at step 230, and if it is currently processing an I-frame (step 260), then the current packet is part of the last found I-frame, so it is sent to the MPEG decoder 34. An example of such a PES packet is packet 4 in FIG. 5. If, on the other hand, an I-frame is not currently being processed (step 260), then the packet is known to be part of another type of frame or any other type of non-video data that can be carried by the stream, e.g. audio, so it is discarded and the next PES packet is searched (steps 215 and 218).

If the PES packet has a picture start indicator at step 230, and the picture type indicates a P or B-frame (step 235), then a check is made as to whether or not an I-frame is currently being processed (step 245). If an I-frame is currently being processed, then reaching this point means that the end of the I-frame has been reached, so the "processing I-frame" indicator is set to "no" (step 260). Therefore, a prediction for the next required I-frame location in the file 46 must be made (steps 250 and 255), and this is used to jump to that location by requesting its byte-range from the server 30 (steps 280 and 205).

In a preferred embodiment the next I-frame location is predicted, as follows:

Let us define $loc_{after}(n)$ as the location of the n-th I-frame after the current one, and:

$$loc_{after}(n) = end_{prev} + (n \times dist_{i\text{-}frame}) - len_{i\text{-}frame}$$

where
$end_{prev}$ is the location of the end of the previous I-frame,
$dist_{i\text{-}frame}$ is the average distance or separation (in bytes) between two I-frames and
$len_{i\text{-}frame}$ is the average length of a single I-frame.

Suppose the current playback speed is s, where s is a multiple of 2 and larger than 1. Then, assuming the MPEG file 46 has 2 I-frames per second, a frame rate of 4 frames-per-second can be achieved using the following formula for calculating the offset of the next required I-frame:

$$next(\ ) = loc_{after}(s/2)$$

In rewind mode, the aim of the client is slightly different in that it must now play I-frames in reverse order. Referring to FIG. 5, suppose that PES packets 16 to 24 on the figure represent 32 KB of buffered data received from the server 22.

The client starts from the end of the buffer and by traversing the PES packets in reverse direction, it searches for a PES packet containing the beginning of an I-frame. This means that packets 24, 23, 22, 21, 20, 19 and 18 will be scanned and the beginning of the I-frame will be found at PES packet 18.

At this point, I-frame decoding will start and all of the packets belonging to the found I-frame must be passed to the MPEG decoder 34. That is, the client starts processing data in the forward direction and packets 18, 19, 20, 21 and 22 are passed to the MPEG decoder. When the end of the I-frame is reached (e.g. indicated by the beginning of a new frame), the client will start searching for the next required I-frame. In rewind mode, the "next required" I-frame is not one of the following frames, but is actually an I-frame that appears before the current I-frame. That is, when the end of PES packet 22 is reached, the I-frame frequency meter will determine the file byte-range that is estimated to contain the next required I-frame and this byte-range will be requested from the server. Afterwards, supposing the data returned from the server contains the PES packets 1 to 8, the same procedure described above is applied to this data and PES packets 3, 4, 5 and 6 are passed to the MPEG decoder.

In a special case, the end of the buffer is reached before the decoding of a particular I-frame is completed in rewind mode. For example, referring again to FIG. 5, suppose that the data buffer 30 contains PES packets 16 to 20. A preferred embodiment will find the beginning of the I-frame at packet 18, and packets 18, 19 and 20 will be passed to the MPEG decoder 34. When the end of the buffer is reached, the embodiment will request the following 32 KB byte-range. The data returned from the server 22 in response to this request may consist of packets 21 to 25. In this case, packets 21 and 22 will also be sent to the MPEG decoder, and then the jump to the next required I-frame will be made.

In another special case, the beginning of the buffer is reached before an I-frame is found in rewind mode. For example, referring to FIG. 5, suppose that the data buffer 10 contains PES packets 8 to 12. Starting from packet 12, the embodiment will search for the beginning of an I-frame in packets 12, 11, 10, 9 and 8. Since an I-frame cannot be found, the embodiment will request the preceding 32 KB byte-range. The data returned from the server 10 in response to this request may consist of packets 2 to 7. In this case, packets 7, 6, 5, 4 and 3 will be searched before the beginning of the I-frame is found at packet 3, and the I-frame decoding process will start as described above.

Referring again to FIG. 7, the implementation of rewind mode is the same as that of the fast-forward mode with the following exceptions:

1) The check for play direction in step 260 is followed by a check for whether an I-frame is currently being processed at step 265. If the client is not currently processing an I-frame, then the byte-range requested from the server is the byte-range immediately before the current byte-range. If the client is currently processing an I-frame then the byte-range requested from the server is the byte-range immediately after the current byte-range. This allows all of the PES packets making up a single I-frame to be read in the forward direction even though playback direction is backwards.

2) The check for play direction in step 215 is followed by step 220 and therefore the PES packet is searched in the data buffer 30 backwards. That is, the search starts from the end of the data buffer and proceeds towards the beginning.

3) In a preferred embodiment, the formula for the prediction of the next required I-frame location in rewind mode becomes slightly different compared to that for fast-forward mode:

Let us define $loc_{before}(n)$ as the location of the n-th I-frame before the current one, and:

$$loc_{before}(n) = end_{prev} - (n \times dist_{i\text{-}frame}) + len_{i\text{-}frame}$$

where $end_{prev}$ is the location of the end of the previous I-frame, $dist_{i\text{-}frame}$ is the average distance or separation (in bytes) between two I-frames and $len_{i\text{-}frame}$ is the average length of a single I-frame.

Suppose the current playback speed is s, where s is a multiple of 2. Then, assuming the MPEG file 26 has 2 I-frames per second, a frame rate of 4 frames-per-second can be achieved using the following formula for calculating the offset of the next required I-frame in rewind mode:

$$next(\ ) = loc_{before}(s/2)$$

Thus, it can be seen that by determining parameters about a received data stream in a first playback mode, e.g. normal playback mode, it is possible to achieve trick-mode playback by streaming data from a conventional HTTP server over a network whilst staying within available bandwidth limits. By requesting, in trick mode, only certain parts or byte ranges of a data stream to be transmitted over a network in dependence on determined parameters, a method and apparatus for the streaming of digital media content may be realised which is capable of use with a conventional HTTP server and of providing user friendly trick-mode playback.

Figure 8:
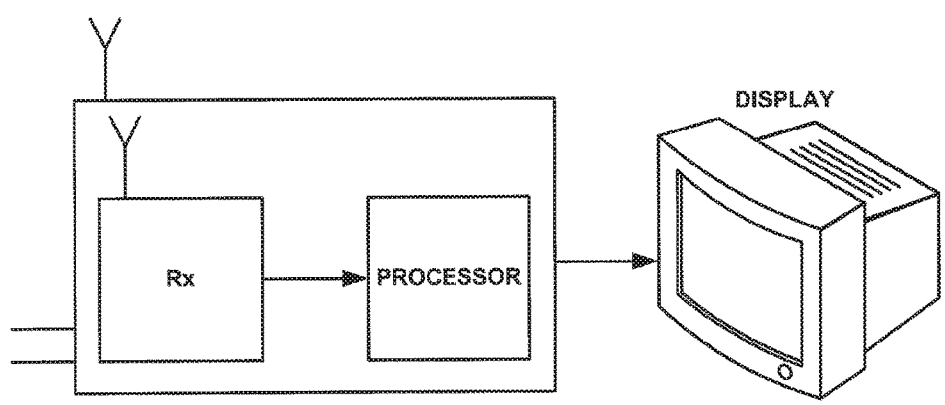
FIG. 8 is a schematic representation of a video playback apparatus.

FIG. 8 is a schematic representation of a video playback apparatus. It is shown schematically only and could be any type of video playback apparatus, e.g. a DVD player, PC, set-top box etc. The playback apparatus includes a receiver for receiving a data stream which may be from an external or an internal source. The playback apparatus is arranged to provide an image signal to a display device and may include apparatus such as that shown in and described with reference to any of FIGS. 4 to 7.

Embodiments of the invention have been described with particular reference to the examples illustrated. However, it will be appreciated that variations and modifications may be made to the examples described within the scope of the invention.

The invention claimed is:

1. A method of streaming of digital media content, the method comprising:
   at a receiver, receiving from a source a stream of digital media content comprising a stream of data frames;
   during playback in normal mode of the digital media content, continuously measuring for a time interval a size and separation of consecutive frames of a defined type and, using a statistical analysis of the measured sizes and separations, determining parameters by the receiver associated with a defined type of frame within the digital media stream; and,
   based upon the determined parameters, estimating a position within the digital media stream of instances of the defined type of frame;
   at the receiver that receives the digital media content, in dependence on the determined parameters, requesting from the source only blocks of the stream of data frames expected to include subsequent or previous frames of the defined type of frame.

2. The method according to claim 1, wherein the digital media stream is an MPEG video stream and the defined type of frame is an I frame.

3. The method according to claim 2, wherein the parameters include the average length of an I frame within the digital media stream and the average separation of I frames within the digital media stream.

4. The method according to claim 1, comprising at a source of the digital media content, in response to a request from a said receiver for only the blocks of the stream of data frames expected to include subsequent or previous frames of the defined type of frame, providing only said blocks to the receiver.

5. The method according to claim 1, in which the method includes playing back in a trick mode a media stream composed only of the defined type of frame.

6. The method according to claim 4, in which the digital media content is provided to the receiver from the source via a network.

7. The method according to claim 1, in which the parameters are determined using a frequency meter.

8. The method according to claim 7, in which the frequency meter is activated for a period during normal playback and then deactivated for a period to reduce system load, and wherein the activation and deactivation is then optionally repeated on a cyclical basis.

9. A method of enabling trick modes to be used in the playback of a digital media stream, comprising, using a method of streaming of digital media content according to claim 1.

10. The method according to claim 9, in which during playback in a trick mode a configurable proportion of the defined type of frame is discarded so as to achieve a desired bandwidth for the media stream.

11. The method according to claim 10, in which the configurable proportion is selected such as to ensure that the required source/receiver bandwidth for playback of the stream in trick mode is the same as that required for playback of the stream in normal playback mode.

12. An apparatus for receiving a stream of digital media content, the apparatus being for connection to a source of a digital media stream, the apparatus comprising:
   a frequency meter for continuously measuring for a time interval during a normal playback mode of operation a length and separation of consecutive frames of a defined type and determining, using a statistical analysis of the measured lengths and separations, the average length and average frequency of the defined type of frame within a received source digital media stream in dependence on the statistical analysis performed by a receiver of the digital media stream during normal playback mode; and
   a playback stream controller for requesting from the source only parts of the source digital media stream in dependence on the determined average frequency and average length of the defined type of frame wherein the playback stream controller is arranged, in dependence on the determined average frequency and average length of I-frames within the source digital media stream, to request, in trick-mode playback, only parts of the source digital media stream expected to include subsequent or previous I-frames.

13. The apparatus according to claim 12, wherein the digital media stream is an encoded MPEG digital media stream and the defined type of frame is an I-frame.

14. The apparatus according to claim 13, including an MPEG parser wherein the frequency meter is arranged in communication with the MPEG parser to determine the length and separation of I-frames within the source digital media stream during normal playback mode.

15. The apparatus according to claim 12, comprising an HTTP client for interface with a network to which, in use, the apparatus is to be connected.

16. The apparatus according to claim 12, in which the source of the digital media stream is external to the apparatus.

17. The apparatus according to claim 12, embodied as one or more of a set-top box for connection to a video display, a digital video recorder, a television and a software application running on a computer.

18. The apparatus according to claim 12, in which the frequency meter is arranged to collect and collate statistical data about the source digital media stream in normal playback mode for use in trick mode playback.

19. The apparatus according to claim 12, wherein a requested byte range is determined based on the position of a next or previous I-frame being expected at a position defined for the next I-frame by:
$loc_{aft}(n)$ as the location of the n-th I-frame after the current one, wherein $$loc_{after}(n) = end_{prev} + (n \times dist_{i\text{-}frame}) - len_{i\text{-}frame}$$

in which
$end_{prev}$ is the location of the end of the previous I-frame,
$dist_{i\text{-}frame}$ is the average separation of two I-frames and
$len_{i\text{-}frame}$ is the average length of a single I-frame,
or, for a previous I-frame, $$loc_{before}(n) = end_{prev} - (n \times dist_{i\text{-}frame}) + len_{i\text{-}frame}$$

in which
$end_{prev}$ is the location of the end of the previous I-frame,
$dist_{i\text{-}frame}$ is the average distance (in bytes) between two I-frames and
$len_{i\text{-}frame}$ is the average length of a single I-frame.

20. The apparatus according to claim 12, wherein the frequency meter is configured to be enabled for a period and then disabled for a period to reduce the load on an associated processor.

21. A method of playback of a source digital media stream in trick mode, the method comprising:
during playback in normal mode of a source digital media stream received from a source, continuously measuring for a time interval a size and separation of consecutive frames of a defined type and, using a statistical analysis of the measured sizes and separations, determining at a receiver one or more parameters about the defined type of frame within the source digital media stream wherein the parameters are determined using the statistical analysis performed by the receiver of the media stream during normal playback mode;
on selection of a trick mode, using the parameters determined about the certain types of frames within the source digital media stream to selectively request from the source only certain parts of the source digital media stream; and
from the requested parts extracting only the certain type of frame for playback in trick mode.

22. The method according to claim 21, in which the digital media stream is an MPEG video stream and the certain type of frame is an I frame.

23. The method according to claim 21, in which during playback in normal mode, statistical data is collected to determine an average length of an I frame and the average separation of I frames within the digital media stream.

24. The method according to claim 23, in which in trick mode playback the certain parts of the source digital media stream requested are those expected to include one or more I frames.

25. The method according to claim 21, in which trick mode can be fast-forward or rewind mode.

26. A communication system, the system comprising:
a source of a digital media stream;
apparatus for playback of a digital media stream connected to the source of the digital media stream, wherein the apparatus is apparatus according to claim 12.

27. The communication system according to claim 26, in which the source of a digital media stream and the apparatus for playback of a digital media stream are connected via a network.

28. The communication system according to claim 27, in which the network is an external network such as the internet.

29. The communication system according to claim 27, in which the network is an internal network such as a LAN.

30. The communication system according to claim 26, in which the digital media source and/or the apparatus for playback is embodied by software running on a computer.

* * * * *